(12) United States Patent
Helmstädter et al.

(10) Patent No.: US 6,256,582 B1
(45) Date of Patent: Jul. 3, 2001

(54) METHOD AND DEVICE FOR NAVIGATION SUPPORT OF A VEHICLE DRIVER

(75) Inventors: Gerald Helmstädter, Weiterstadt; Kai Schmischke, Neuberg, both of (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/297,622
(22) PCT Filed: Nov. 18, 1997
(86) PCT No.: PCT/EP97/06412
§ 371 Date: Aug. 2, 1999
§ 102(e) Date: Aug. 2, 1999
(87) PCT Pub. No.: WO98/23919
PCT Pub. Date: Jun. 4, 1998

(51) Int. Cl.$^7$ .................................................. G01C 21/20
(52) U.S. Cl. .......................... 701/211; 701/209; 340/990; 340/991
(58) Field of Search ................................. 701/211, 213, 701/201, 209, 210; 340/988, 995, 991

(56) References Cited

U.S. PATENT DOCUMENTS

| | | | |
|---|---|---|---|
| 5,274,387 | * 12/1993 | Kakihara et al. | 342/451 |
| 5,648,768 | * 7/1997 | Bouve | 340/988 |
| 6,018,697 | * 1/2000 | Morimoto et al. | 701/209 |
| 6,064,941 | * 5/2000 | Nimura et al. | 701/210 |
| 6,084,543 | * 7/2000 | Iizuka | 342/357.13 |
| 6,107,944 | * 8/2000 | Behr et al. | 340/995 |

FOREIGN PATENT DOCUMENTS

| | | |
|---|---|---|
| 4219326 | 12/1992 | (DE) . |
| 4301875 | 8/1993 | (DE) . |
| 0346491 | 12/1989 | (EP) . |
| 0534533 | 3/1993 | (EP) . |
| 9208952 | 5/1992 | (WO) . |
| 9607110 | 3/1996 | (WO) . |

* cited by examiner

Primary Examiner—Tan Nguyen
(74) Attorney, Agent, or Firm—Richard A. Speer; Mayer, Brown & Platt

(57) ABSTRACT

In a method for navigational assistance to a vehicle driver who is issued instructions which are derived from a comparison of a route, prescribed by route reference points, and respectively determined positions of the vehicle, the route reference points and connections between the route reference points of at least a portion of the prescribed route are represented diagrammatically.

12 Claims, 1 Drawing Sheet

METHOD AND DEVICE FOR NAVIGATION SUPPORT OF A VEHICLE DRIVER

BACKGROUND OF THE INVENTION

The invention relates to a method and a device for navigational assistance to a vehicle driver who is issued instructions which are derived from a comparison of a route, prescribed by route reference points, and respectively determined positions of the vehicle.

Systems for assisting the navigation of vehicles have become known in which after inputting the start point and destination this information is transmitted from a vehicle unit into a fixed computer (traffic computer). There, a digital map base is used to determine a route between the start point and destination. This route is transmitted to the vehicle unit in the form of a list of route reference points. Data are also transmitted on the route reference points, in particular the type of the route reference point, for example an intersection, a junction, a rotary intersection. Finally, the distances between the route reference points are transmitted to the vehicle unit. These systems are also known as off-board navigation systems.

In the known systems, the guidance information is transmitted to the driver in the form of symbolized representations of the guidepoints, especially the intersections and junctions. The vehicle driver lacks any information on the next segment of the roadway. He must therefore put his complete trust in the functionability of the system. Furthermore, imprecise calculation of vehicle position and complex street segments can cause the vehicle driver to change lanes rapidly when this is not necessary.

BRIEF SUMMARY OF THE INVENTION

The object of the invention is to improve how the information is represented for the vehicle driver.

This object is accomplished using the process in accordance with the invention in that the guide point and connections between the guideposts are graphically represented for at least a section of the predetermined roadway. This representation can occur in that only the section of the roadway that is in front of the vehicle is represented or in that only a part thereof is represented. The current position of the vehicle is then located on the lower edge of the display, while the representation of the roadway and the guide points move to correspond to vehicle movement.

The method according to the invention is suitable for off-board systems. In these systems it is provided that data which describe the prescribed route and the route reference points are transmitted from a fixed computer to a vehicle unit located in the vehicle.

For the purpose of further improving the orientation of the driver, it is provided in a development that the representations of the route reference points also contain symbols for roads which diverge from the route reference points and do not lie on the prescribed route. It is advantageous in this case if the symbols are short lines which differ from the connections between the route reference points.

In order to be able to make a better estimate of the position of the vehicle within the route, in particular the relationship between the track covered and that lying ahead, it can also be provided, however, in the case of the method according to the invention that, furthermore, a symbol for the respectively determined position of the vehicle is represented.

If a vehicle deviates from the prescribed route, in the known systems an alternative route which leads to the destination at least partly on a different stretch is calculated. There is a description of a method in patent application Ser. No. 196 16 071 of the applicant which calculates alternative routes as a precaution even before the vehicle deviates from the prescribed route, and transmits them to the vehicle unit. It can therefore be provided within the scope of the method according to the invention that, furthermore, stretches and route reference points are represented which lie on alternative routes.

A development of the method according to the invention consists in that, furthermore, data on the traffic conditions are transmitted and represented in the form of symbols assigned to the respective route reference points and/or the stretches lying between the route reference points. These data can relate, to traffic obstructions such as jams, blockages or weather influences.

A device in accordance with the invention for guidance support for the driver of a vehicle comprising a graphical display apparatus (display) for outputting instructions that are derived by comparing the roadway predetermined by guidepoints to the positions of the vehicle that are determined, in which data that describe the predetermined roadway and guidepoints are transmitted from a fixed computer to a vehicle unit in the vehicle, is characterized in that the guidepoints and connections between said guidepoints graphically represent at least a part of the predetermined roadway.

For further improving the orientation of the driver, in a further development of the device in accordance with the invention it is provided that the representations of the guidepoints also contain symbols for streets outgoing from the guidepoints, which streets are not located on the predetermined roadway. It is advantageous for they symbols to be short lines that differ from the connections between the guidepoints.

In the device in accordance with the invention it can further be provided that one symbol is represented for each position calculated for the vehicle.

The device in accordance with the invention can furthermore be designed such that each guidepoints the vehicle approaches can be graphically represented to include at least one directional arrow. It is possible for this representation to be switched on either as an alternative with the road map, or in addition to the road map, it being the case that the representation of the respective route reference point reproduces the road layout at the route reference point, for example a rotary intersection.

BRIEF DESCRIPTION OF THE DRAWINGS

The invention permits numerous embodiments. Two of them are represented diagrammatically in the drawing with the aid of a plurality of figures, and described below. In the drawing.

DETAILED DESCRIPTION OF THE INVENTION

Figure 1:
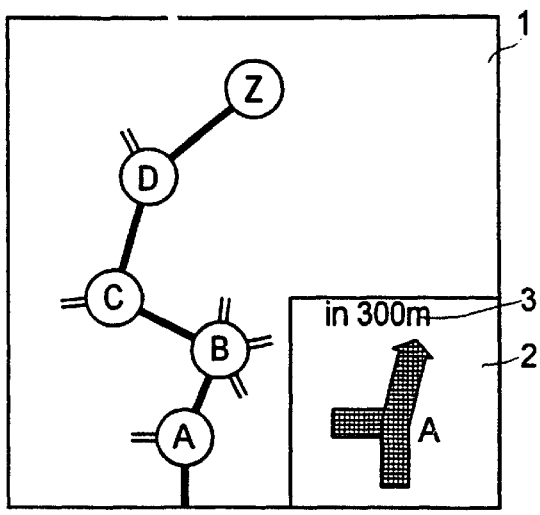
FIG. 1 shows the representation in accordance with a first exemplary embodiment.
Figure 2:
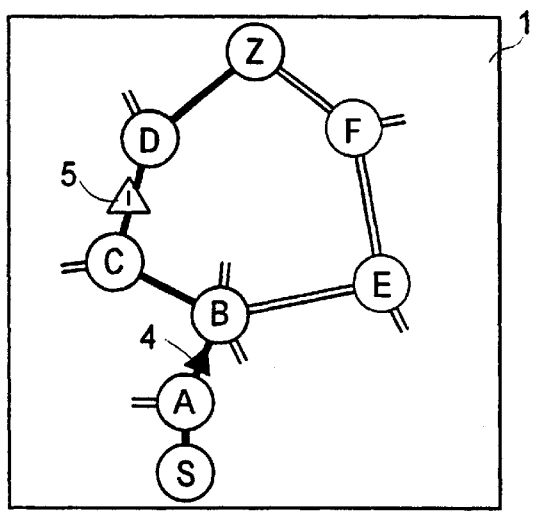
FIG. 2 shows the representation in accordance with a second exemplary embodiment.

FIGS. 1 and 2 respectively show a display screen 1 on which route reference points A, B, C, D and a destination Z are represented in accordance with their approximate geographical position, including the stretches connecting them. The latter are reproduced in an emphasized fashion by comparison with roads branching off at the route reference points A to D.

In the representation according to FIG. 1, the vehicle is evidently located at the lower edge of the image and is driving toward the route reference point A.

A symbolic representation of the route reference point A may be seen in an overlaid window 2. An indication 3 of the distance between the vehicle and the route reference point A is also overlaid in the window 2. Further information, for example the distance still remaining to the destination, can likewise be provided in the window 2 or at another suitable position on the display screen 1.

The entire prescribed route between the start point S and the destination Z is represented on the display screen 1 in the exemplary embodiment according to FIG. 2. The vehicle is located at the current instant between the route reference points A and B and is represented as symbol 4. A traffic jam indicated by a symbol 5 is located on the stretch between the route reference points C and D. In the case when, at route reference point B, the vehicle driver leaves the prescribed route or would like to avoid the traffic jam an alternative route leading to the destination Z via further route reference points E, F has been calculated in the traffic computer. The representation of the alternative route is envisaged by contrast with the prescribed route.

Color displays are mostly available for the representation shown in FIGS. 1 and 2, and so it is possible to optimize the representations in terms of layout and color in order to make them effectively recognizable. In the case of a device for navigational assistance, it is possible, for example, for the window 2 (FIG. 1) to be faded in or out as the vehicle driver chooses, or to occupy the entire display screen 1 if the vehicle driver regards representing the route as unimportant.

Figure 3:
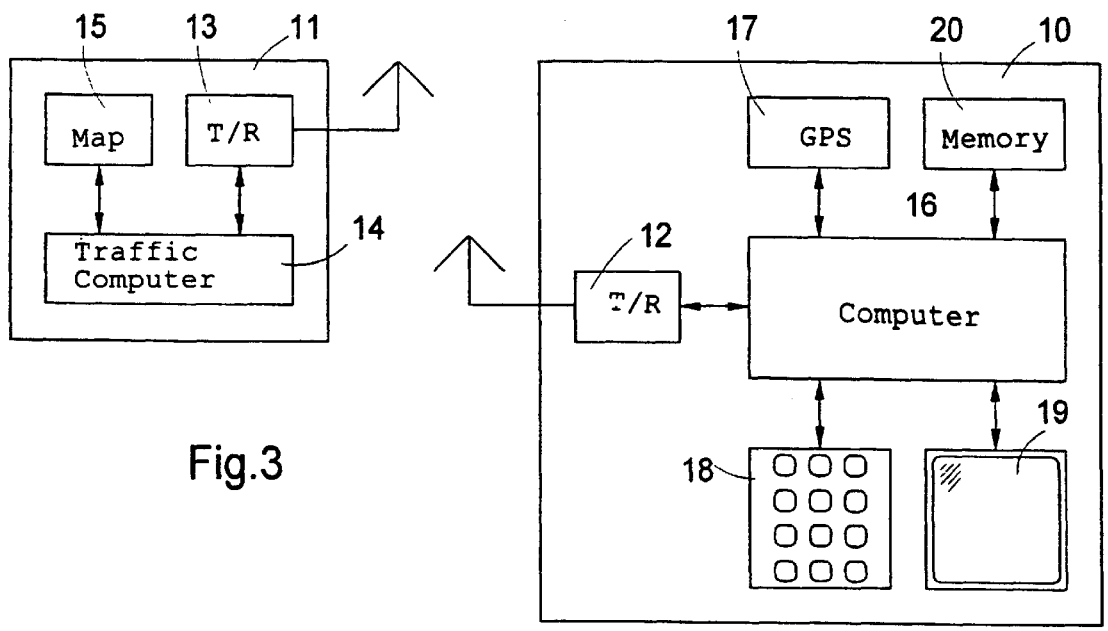
FIG. 3 shows a block diagram of an exemplary embodiment of a device according to the invention.

The exemplary embodiment, represented as a blocked diagram in FIG. 3, of a device according to the invention comprises a vehicle unit 10 and a central device 11 between which there exists a radio connection, for example according to the GSM standard, respectively having a transmitter/receiver 12, 13. Located in the central device 11 is a traffic computer 14 which has access to a stored road map 15 and undertakes to determine routes for many vehicles.

The vehicle unit 10 essentially comprises an onboard computer 16, a GPS receiver 17, an input device 18, a display device 19 and a memory 20. These components are known per se and need not be explained in more detail for understanding the invention. The display device comprises a display screen, for example using liquid crystal technology, on which the representations shown by way of example in FIGS. 1 and 2 can be reproduced.

The GPS receiver 17 continuously feeds the onboard computer 16 with information on the geographical position of the vehicle. The driver of the vehicle can use the input device 18 to input a destination. The latter is fed together with the current position to the traffic computer 14 which uses the road map 15 to determine the desired route and transmit it to the vehicle unit 10 in the form of a list of route reference points. Depending on the configuration of the method according to the invention, the traffic computer also calculates, as described above, alternative routes to the individual route reference points which are likewise transmitted to the vehicle unit, and also communicates traffic reports which are relevant to the respective route.

The position reports of the GPS receiver 17 tell the onboard computer to what extent route reference points on the desired route have been reached, with the result that the map representations in accordance with FIGS. 1 and 2 are updated as the vehicle moves along, and the navigational information 2 (FIG. 1) is indicated for the route reference point respectively lying ahead.

What is claimed is:

1. A method for guidance support for the driver of a motor vehicle to whom instructions are provided, the steps comprising:

(a) deriving instructions by comparing a prescribed route and an alternative route predetermined by guidepoints to the positions calculated for the vehicle; and providing data that describe the prescribed route and the alternative route and guidepoints being transmitted from a fixed computer to a receiving unit located in the vehicle, wherein the guidepoints and connections between the guidepoints of at least one section of the prescribed route and the alternative route are displayed in a single combined graphic representation.

2. Method in accordance with claim 1, characterized in that the representations of said guidepoints also contain symbols for streets outgoing from said guidepoints that are not located on the prescribed and alternative routes roadway.

3. Method in accordance with claim 2, characterized in that the symbols are short lines that differ from said connections between the guidepoints.

4. Method in accordance with any of the preceding claims, characterized in that furthermore a symbol is represented for each position calculated for the vehicle.

5. Method in accordance with claim 1, characterized in that furthermore routes and guidepoints are represented that are located on alternative routes.

6. Method in accordance with claim 4, characterized in that furthermore data regarding traffic are transmitted and are represented in the form of symbols allocated to the respective guidepoints and/or to the routes located between the guidepoints.

7. An apparatus for guidance support for the driver of a motor vehicle, using data that describe a prescribed route and an alternative route with guidepoints being transmitted from a fixed computer to a receiving unit located in the vehicle, comprising a graphical display device for outputting instructions that are derived by comparing the prescribed route and the alternative route predetermined by guidepoints to the positions calculated for the vehicle, wherein the guidepoints and connections between the guidepoints are displayed in a single combined graphic representation.

8. Apparatus in accordance with claim 7, characterized in that the representations of said guidepoints also contain symbols for streets outgoing from the guidepoints that are not located on the prescribed and alternative routes.

9. Apparatus in accordance with claim 8, characterized in that the symbols are short lines that differ from the connections between the guidepoints.

10. Apparatus in accordance with claim 6, characterized in that furthermore a symbol is represented for each position calculated for the vehicle.

11. Apparatus in accordance with claim 10, characterized in that furthermore each guidepoint that the vehicle approaches can be graphically represented, including at least one directional arrow.

12. Apparatus in accordance with claim 7, characterized in that the representation for each guidepoint reflects the traffic flow at the guidepoint.

* * * * *